United States Patent [19]

Takamatsu et al.

[11] 4,189,637
[45] Feb. 19, 1980

[54] DEVICE FOR DETECTING ANGULAR ACCELERATION OF WHEELS

[75] Inventors: Hiroshi Takamatsu, Iruma; Makoto Sato, Kamifukuoka; Yoshitaka Miyakawa, Kawagoe; Yutaka Arai, Shiki; Etsuo Fujii, Wako, all of Japan

[73] Assignee: Honda Giken Kogyo Kabushiki Kaisha, Tokyo, Japan

[21] Appl. No.: 924,432

[22] Filed: Jul. 13, 1978

[30] Foreign Application Priority Data

Jul. 21, 1977 [JP] Japan .................. 52-86678

[51] Int. Cl.² ............................................. G01D 5/34
[52] U.S. Cl. .............................. 250/231 R; 73/517 R
[58] Field of Search ............... 73/517, 518; 250/23 R, 250/23 SE, 237 G

[56] References Cited

U.S. PATENT DOCUMENTS

| 3,524,067 | 8/1970 | West | 250/231 R |
| 3,798,454 | 3/1974 | Weiss | 73/517 R |

Primary Examiner—David C. Nelms
Attorney, Agent, or Firm—Haseltine, Lake & Waters

[57] ABSTRACT

A device for detecting angular acceleration of wheels comprising a first member integrally rotating with a wheel, a second member mounted on the first member through a resilient member so that the second member may be rotated relative to the first member. A mechanism is provided for detecting relative rotation between the first member and the second member. A control mechanism is provided for the wheel for controlling the relative rotation between the first member and the second member so as not to actuate the relative rotation detecting mechanism when the magnitude of angular acceleration of the wheel in one direction or the other is less than a predetermined magnitude.

12 Claims, 13 Drawing Figures

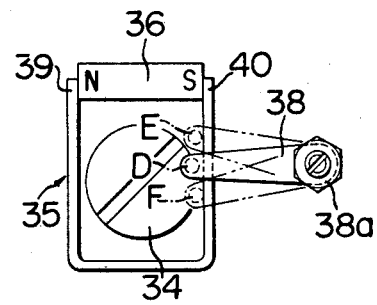
FIG. 10
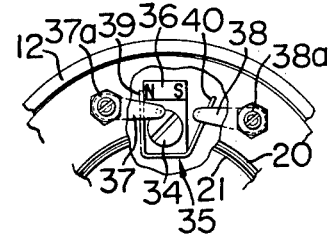
FIG. 11
FIG. 12
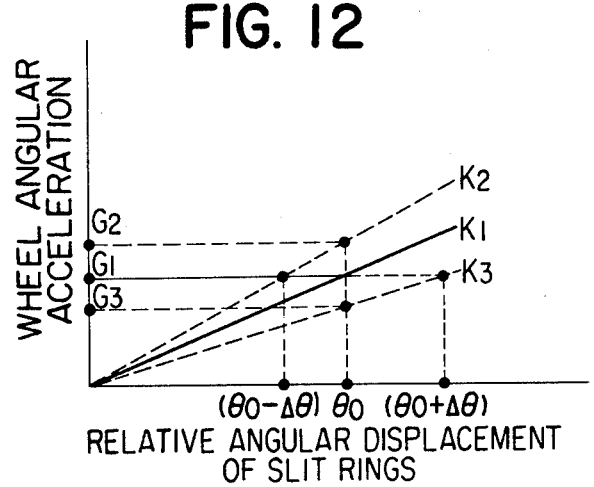
FIG. 13
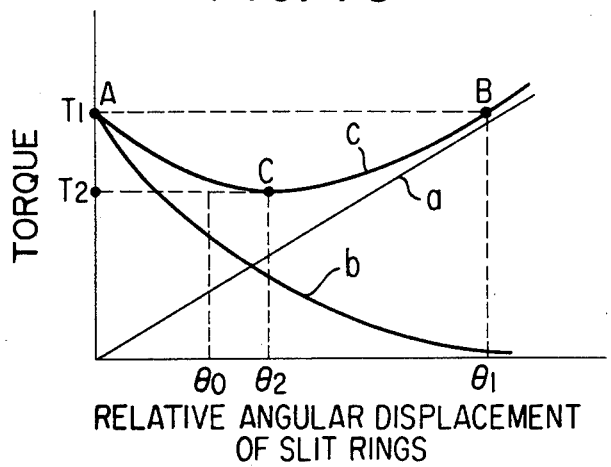

ived element on the basis of
photoelectric effect thereof.

DEVICE FOR DETECTING ANGULAR ACCELERATION OF WHEELS

BACKGROUND OF THE INVENTION

The present invention relates to a device for detecting the angular acceleration of wheels, which can, when the wheels produce an angular acceleration whose absolute value is in excess of a predetermined value, accurately detect such angular acceleration without being affected by temperature conditions at the time of use, and without being affected by the finishing accuracy of parts, or by minor deviations in the shape and the material of the members used.

For example, an anti-skid brake device of a wheel may be designed so that the device may be actuated in correspondence with the angular acceleration of the wheel. In this case, however, the angular acceleration of the wheel must first be detected accurately in order to accurately actuate the anti-skid brake device.

Accordingly, the device for detecting angular acceleration of wheels in accordance with the present invention may be effectively applied to the anti-skid brake device, for example. In the present invention, the angular acceleration includes two concepts, that is, positive and negative angular accelerations, one for the positive acceleration when the wheel increases in speed in one direction, and the other for the negative acceleration when the wheel rotating in the same direction decreases in speed.

In a detecting device for detecting angular acceleration of wheels comprising a first member integrally rotating with a wheel, a second member mounted on said first member through a resilient member so that said second member may be rotated relative to said first member, and relative rotation detecting means for detecting the relative rotation between said first member and said second member, the relative rotation detecting means is generally affected by the temperature conditions at the time of use, by the finishing accuracy of the parts, or minor deviations in the shape and material of the members used. As a consequence, the relative rotation detecting means may not always operate accurately, when the magnitude of relative rotation between the first and second members reaches a predetermined value, to detect the presence of the relative rotation between the first member and the second member.

For example, one known relative rotation detecting device includes a first slit ring mounted on a first member and a second slit ring mounted on a second member, the first and second slit rings being relatively rotated with each other between a light emitting element and a light receiving element. In this device, slits in the first slit ring are normally not superposed on slits in the second slit ring and are thus maintained in a shielding state, but when the slits in the first slit ring and the slits in the second slit ring are superposed on one another to allow the light emitted by the light emitting element to pass through the light receiving element and thereby the presence of relative rotation between the first member and the second member may be detected by the action of the light receiving element on the basis of photoelectric effect thereof.

In this case, the intensity of light emitted from a light emitting element constituting the light emitting body and the light receiving sensitivity of a light receiving element constituting the light receiving body are generally influenced by the temperatures at the time of use. It therefore happens that the light receiving body is not actuated immediately when the slits in the first slit ring begin to be superposed on the slits in the second slit ring, and the light receiving body begins to be actuated for the first time when the slits in the first slit ring progress, to some extent, to be superposed on the slits in the second slit ring. Each of the slit rings is formed with a multitude of slits in circumferentially equally spaced relation. Due to the limitation of the accuracy of finishing, however, the slits in each of the slit rings are not always disposed in accurately equally spaced relation, and additionally, the circumferential widths of the slits are not always completely uniform. For this reason, even if relative rotation should occur between the first member and the second member, the transmission quantity of light differs with the particular slits superposed on one another and, as a consequence, it is sometimes difficult for the light receiving body to detect the relative rotation between the members. Further, the resilient member adapted to connect the first member to the second member unavoidably becomes somewhat uneven in shape and material depending on the product. In such a case, even if a given angular acceleration is produced in the wheel by the resilient member used, the magnitude of relative rotation produced between the first and second members may vary, and as a result, there gives rise to the disadvantage that the minimum quantity of relative rotation required for detection of the relative rotation by the relative rotation detecting device differs with different products.

SUMMARY OF THE INVENTION

In view of the foregoing, it is an object of the present invention to provide a device for detecting angular acceleration of wheels, which can, when the wheels produce an angular acceleration whose absolute value is in excess of a predetermined value, accurately detect such angular acceleration without being affected by temperature conditions at the time of use, by the finishing accuracy of the parts, or by minor deviations in the shape and the material of the members used.

BRIEF DESCRIPTION OF THE DRAWINGS

FIG. 10 is an enlarged view showing a part of FIG. 2.

FIG. 11 shows the operating state of part of FIG. 2.

FIG. 12 is a graph which shows the relationship between angular acceleration of the wheel and variation of relative angle of the slit rings.

FIG. 13 is a graph which shows the relationship between the variation of the relative angle of the slit rings and resisting torque.

DETAILED DESCRIPTION

Figure 1:
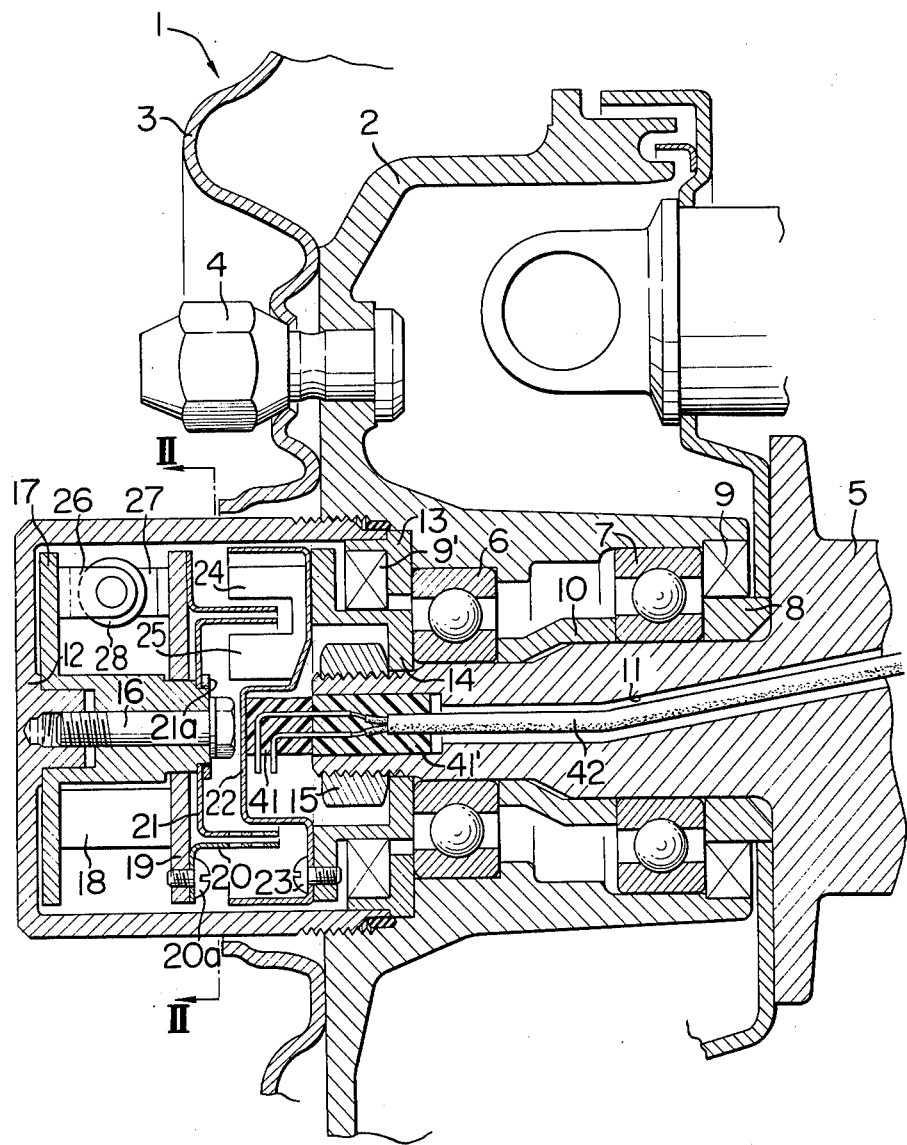
FIG. 1 is a longitudinal sectional view of a main portion of a device for detecting angular acceleration of a wheel showing a preferred embodiment in accordance with the present invention.

Turning first to FIG. 1, therein is shown a wheel 1 having a disk 3 mounted on a wheel hub 2 by means of a mounting bolt 4, the wheel hub 2 being rotatably supported on a fixed axle 5 through a pair of bearings 6 and 7 whose axial positions are determined by space holding members 8 and 10. Externally of the bearing 6, the fixed axle 5 further has a photoelectric switch holding member 14 fitted thereon, the holding member 14 being fixedly fastened by means of a fastening nut 15.

A switch cover 22, which carries a light emitting body 24 composed of a light emitting element, and a light receiving body 25 composed of a light receiving element, positioned radially inwardly of the light emitting body 24, is fastened to the photoelectric switch holding member 14 by means of a fastening bolt 23. The light receiving element constituting the light receiving body 25 is actuated by photoelectric effect, whereby when the light receiving body 25 receives the light emitting body 24, the light energy thereof is converted into an electric current to actuate, for example, an antiskid brake device or the like (not shown), through a connector 41 secured to a central portion of the switch cover 22, a connector 41' positioned opposite the connector 41 and formed at the end portion of the fixed axle 5, and a wiring 42 extending through a guide opening 11 into the fixed axle 5. A seal member 9 is interposed between the wheel hub 2 and the space holding member 8, and a seal member 9' is interposed between an annular member 13 fitted in the inner peripheral surface of the wheel hub 2 and a cylindrical outer peripheral surface of the photoelectric switch holding member 14. An inner end edge portion of a casing 12 is threadably engaged with the wheel hub 2 concentrically of the wheel 1 in such a manner so as to surround the photoelectric switch holding member 14 and the switch cover 22.

A rotatable base plate 17 is fastened by means of a fastening bolt 16 to an internal surface of an outer end wall of the casing 12. As may be seen in FIGS. 1, 2 and 3, the rotatable base plate 17 has a flywheel 19 mounted concentrically thereof through three flat springs 18, which are peripherally disposed in an equally spaced relation and radially orientated, so that plate 17 and flywheel 19 may be relatively rotated within the range of flexure of the flat springs 18. As particularly shown in FIG. 4, each of the flat springs 18 has one side secured to the rotatable base plate 17 by means of a fastening bolt 18a while the other side is secured to the flywheel 19 by means of a fastening bolt 18b so that the flat spring may be normally held in a state perpendicular to both the rotatable base plate 17 and the flywheel 19.

Figure 2:
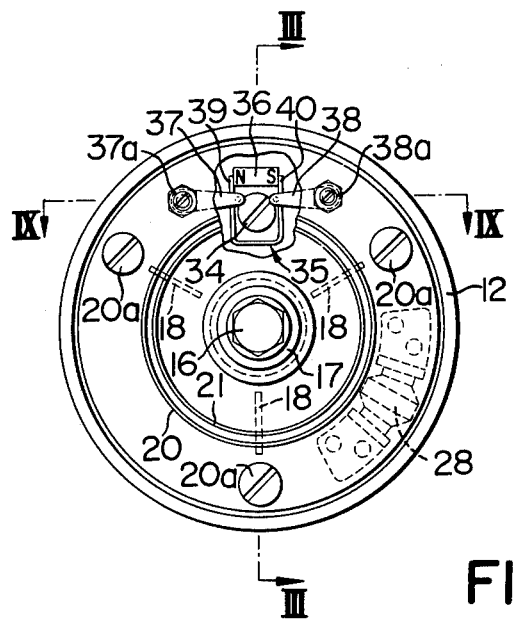
FIG. 2 is a cross sectional view taken on line II—II in FIG. 1.
Figure 5:
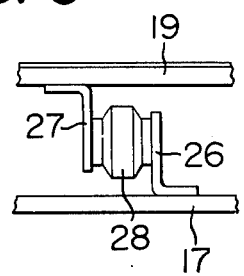

As shown in FIGS. 1, 2 and 5, between the two flat springs 18, there is a damper 28 interposed between a bracket 26 fastened to the rotatable base plate 17 and a bracket 27 fastened to the flywheel 19. This damper serves to suitably relieve shocks resulting from the relative rotation between the rotatable base plate 17 and the flywheel 19.

Figure 3:
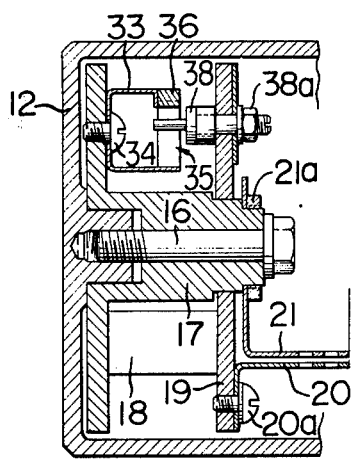
FIG. 3 is a longitudinal sectional view taken on line III—III in FIG. 2.
Figure 4:
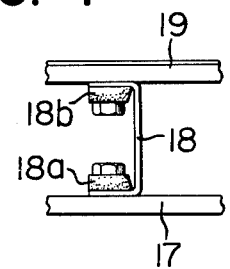
FIGS. 4 and 5 are respective enlarged sections of parts of FIG. 2.

As may be seen in FIGS. 1, 2 and 3, a base end edge of outer slit ring 20 is fastened to the flywheel 19 by means of a fastening bolt 20a, and a base end edge of inner slit ring 21 is fastened to the foremost end of a boss of the rotatable base plate 17 by means of a fastening ring 21a. The foremost end edges of the slit rings 20 and 21 extend between the light emitting body 24 and the light receiving body 25.

Figure 6:
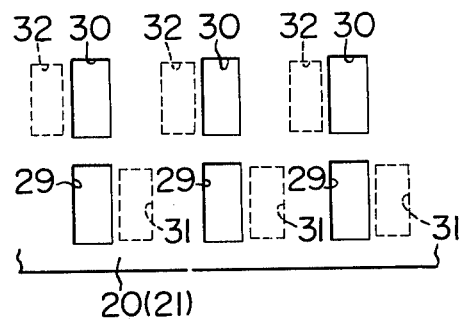
FIG. 6 is an enlarged developed view of the slit rings of FIG. 1.

As shown in FIG. 6, the outer slit ring 20 has one group of slits 29, whose circumferential width and axial width are equal to each other, and which are circumferentially disposed in an equally spaced relation, and another group of slits 30, whose circumferential width and axial width are equal to each other, which are circumferentially disposed in an equally spaced relation, are positioned to be axially spaced from the row of slits 29, and are aligned parallel to the row of slits 29. Also, the inner slit ring 21 has one group of slits 31, whose circumferential width and axial width are equal to each other, and which are aligned normally in a state displaced in phase by a given distance from the respective slits 29 in one direction as viewed circumferentially, and another group of slits 32, whose circumferential width and axial width are equal to each other, and which are aligned normally in a state displaced in phase by a given distance from the respective slits 30 in a direction opposite that of the respective slits 31 as viewed circumferentially. Since there is produced relative rotation between the rotatable base plate 17 and the flywheel 19 during the rotation of the wheel 1 at a constant speed, each slit ring is held in position to block the light from the light emitting body 24, as shown in FIG. 6.

When the wheel 1 is accelerated in one direction, there is produced relative rotation in one direction between the rotatable base plate 17 and the flywheel 19, and as a result, either row of slits 29 and slits 31 or slits 30 and slits 32 are superposed on one another. At this time, the light emitted from the light emitting body 24 passes through the superposed slits so that the light receiving body 25 senses the light of the light emitting body 24.

Then, when the wheel 1 is braked or accelerated in the opposite direction, there is produced relative rotation in the opposite direction between the rotatable base plate 17 and the flywheel 19, and as a result, the row of slits 29 and slits 31 or slits 30 and slits 32 are superposed on one another. At this time, the light emitted from the light emitting body 24 passes through the superposed slits so that the light receiving body 25 senses the light of the light emitting body 24.

In this case, whether the angular acceleration of the wheel 1 is positive or negative may be discriminated by the fact that light receiving body 25 senses the light passed through the particular row of slits.

Figure 7:
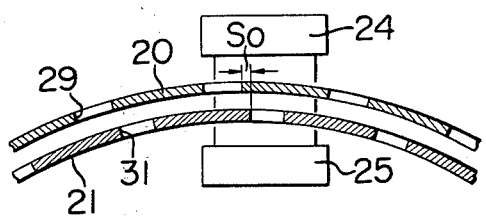
FIG. 7 is a cross-sectional view of the slit rings in a portion of a relative rotation detecting device.
Figure 8:
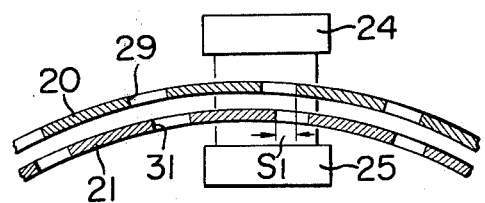
FIG. 8 is a cross-sectional view similar to FIG. 7 in a different state.
Figure 9:
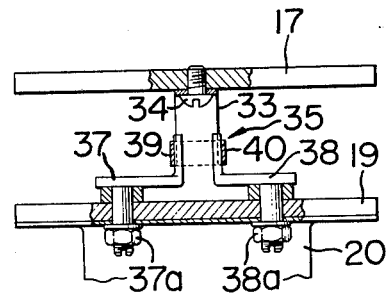
FIG. 9 is a sectional view taken on line IX—IX in FIG. 2.

FIGS. 7 and 8, which illustrate one example of the state wherein slits are superposed, the group of slits 29 and the group of slits 31 are superposed on each other. As shown in FIG. 7, when the wheel 1 is rotated at a constant speed, the slits 29 and the slits 31 are spaced from each other by the distance $S_0$ in a circumferential direction, and the light from the light emitting body 24 is blocked. When the wheel 1 is accelerated or braked, the slits 29 and the slits 31 are superposed on each other over the length $S_1$ as viewed in a circumferential direction, as shown in FIG. 8.

The intensity of the light emitted by the light emitting body 24 and the sensitivity of the light sensed by the light receiving body 25 are influenced by temperature. The minimal superposed length in a circumferential direction of the slits required by the light receiving body 25 to sense the light of the light emitting body 24 for demonstrating its function varies with a level of temperature. It is also difficult in terms of finishing accuracy that the degree of superposition of each slit 29 to the corresponding slit 31 is made to be fully uniform with respect to all slits. In such a case, the result is that the time when the slit 29 begins to be superposed on the slit 31 and the light receiving body 25 begins to sense the light of the light emitting body 24 differs for each pair of slits. A further result is that variation in the spring constants of the flat springs 18, depending on the individual product, causes variation in magnitude of angular acceleration of the wheel 1 when the light receiving body 25 begins to sense the light from the light emitting body 24.

FIG. 12 shows the relationship between the angular acceleration of the wheel 1 taken on the ordinate and the displacement in relative angle of slit rings 20 and 21 taken on the abscissa, indicating how the displacement in relative angle of respective slit rings 20 and 21 varies when the spring constant of the flat spring 18 varies. It is assumed that the spring constant of the flat spring 18 is K, the angular acceleration of the wheel 1 is G, the displacement in relative angle of the slit rings 20 and 21 is $\theta_0$, and at this time, the light receiving body 25 actuated. When the spring constant of the flat spring 18 varies to assume $K_2$ or $K_3$, the magnitude of angular acceleration at which the light receiving body 25 is actuated varies to assume $G_2$ or $G_3$, respectively.

Further, even if the magnitude of angular acceleration of the wheel 1 is $G_1$, the spring constant of the flat spring 18 varies between $K_2$ or $K_3$. As a consequence, the displacement in relative angle of the slit rings 20 and 21 varies between angular displacement $\theta_0 - \Delta\theta$, which is smaller than $\theta$ at which the light receiving body 25 begins to actuate, or angular displacement $\theta_0 + \Delta\theta$, which is greater than the reference angullar displacement $\theta_o$.

In order to have the light receiving body 25 positively sense the light of the light emitting body 24 for commencement of operation when the angular acceleration of the wheel 1 reaches a constant angular acceleration removing the deviation of operation as previously mentioned, it is necessary to control or restrict the relative displacement between the rotatable base plate 17 and the flywheel 19 until the absolute value of angular acceleration of the wheel 1 increases to a degree that may completely eliminate the non-uniformity of operation resulting from change in temperature, accuracy of finishing and variation in spring constant.

As shown in FIGS. 2, 3, 9, 10 and 11, between two adjacent flat springs 18 in a position where a damper 28 is not mounted, the rotatable base plate 17 has a supporting frame 33 fastened thereto by a fastening bolt 34, the frame 33 having a pair of arms axially extended at outer and inner positions. A magnet 36 is secured to the foremost end of the outer arm of frame 33. The base end of a relative rotation controlling frame 35 is secured to the foremost end of the inner arm and the frame 35 is provided with a pair of resilient arms 39 and 40 each having a free end opposite magnet 36. The resilient arms 39 and 40 are normally attracted by opposite end surfaces of the magnet 36.

The ends of a pair of engageable arms 37 and 38 are fastened to the flywheel 19 by means of fastening bolts 37a and 38a, respectively, in such a manner so as to dispose the relative rotation controlling frame 35 therebetween. The engageable arms 37 and 38 extend from bolts 37a and 38a towards one another and have bent ends extending in parallel opposed relation in engagement with the inner surfaces of the corresponding resilient arms 39 and 40, respectively.

Thus, when the wheel 1 is accelerated or braked, the rotatable base plate 17 and the flywheel 19 tend to undergo relative rotation. However, when the torque at that time is less than a given value determined by the magnetic force of the magnet 36, each of the resilient arms 39 and 40 is attracted by the magnet 36, thus preventing relative rotation between the rotatable base plate 17 and the flywheel 19.

When the wheel is further accelerated or braked, the rotatable base plate 17 and the flywheel 19 undergo relative rotation similarly to the case in which the magnet and resilient arms are not present. In this case, however, when the torque exceeds the given value, the engageable arm 37 or 38 causes the resilient arm 39 or 40 to be resiliently deflected against the magnetic force of the magnet 36. FIG. 11 illustrates the state where the resilient arm 40 is deflected by the engageable arm 38 against the magnetic force of the magnet 36.

When the resilient arm 39 or 40 is deflected, there is produced relative rotation between the rotatable base plate 17 and the flywheel 19. As a result, the slit 29 is superposed on the slit 31 or the slit 30 is superposed on the slit 32 so that the light receiving body 25 positively receives the light from the light emitting body 24 without non-uniformity of operation.

FIG. 13 is a graphic respresentation showing the mode of operation. The ordinate represents magnitude of torque and the abscissa represents relative angle of displacement of the slit rings 20 and 21. In this case, assuming that the spring constant of the flat spring 18 is K, the relationship between the resisting torque due to the flat spring 18 and relative angle of displacement of the slit rings 20 and 21 is represented by the straight line a. The relationship between the resisting torque due to the magnetic force of the magnet 36 and the relative angle of displacement of the slit rings 20 and 21 is represented by the curve b. Accordingly, the relationship of the resultant force of the resisting torque due to the flat spring 18 and the resisting torque due to the magnetic force of the magnet 36, to the relative angle of displacement of the slit rings 20 and 21 is represented by the curve c.

Accordingly, if the torque, which causes the slit rings 20 and 21 to effect relative rotation, resulting from acceleration or braking of the wheel 1, is smaller than the magnitude $T_1$ of the resisting torque at point A, there is no relative rotation of the slit rings 20 and 21. However, at the moment the torque, which causes the slit rings 20 and 21 to effect relative rotation, exceeds the magnitude $T_1$ of the resisting torque, the slit rings 20 and 21 relatively rotate until they reach a displacement of relative angle $\theta_1$ corresponding to point B. Then, as the absolute value of the angular acceleration of the wheel 1 decreases, the relationship between the magnitude of torque and the relative angle of displacement of the slit rings 20 and 21 reaches the minimum point C along the curve c.

When the relative angle of displacement of the slit rings 20 and 21 tends to become smaller than $\theta_2$ corresponding to the minimum point C, the resisting torque due to the flat spring 18 and the magnetic force of the magnet 36 becomes greater than torque $T_2$, which tends to maintain the displacement of the relative angle of the slit rings 20 and 21 to rapidly annul the displacement of relative angle of the slit rings 20 and 21. The relationship between the magnitude of the resisting torque and the relative angle of displacement of the slit rings 20 and 21 during that time changes from the minimum point C to point A along the curve c.

Any unevenness of operation of the light receiving body 25 may be completely avoided by setting the spring constant of the flat spring 18 and the magnetic force of the magnet 36 in a manner so as to make the displacement $\theta_2$ of the relative angle of the slit rings 20 and 21 corresponding to the minimum point C greater than the maximum value $\theta_0$ of the relative angle of displacement of the slit rings 20 and 21 which causes unevenness of operation of the light receiving body 25. As shown in FIG. 10, by changing the engaging point of the engageable arm 38 with the resilient arm 40, for example, from the point D to point E or point F, the bending length of the resilient arm 40 may be changed thereby to give an effect similar to the case in which the magnitude of magnetic force of the magnet 36 is substantially changed.

In the above-mentioned embodiment, the rotatable base plate 17 constitutes a first member, the flat springs 18 constitute resilient members, the flywheel 19 constitutes a second member, the light emitting body 24 and the light receiving body 25 cooperate with each other to constitute a relative rotation detecting apparatus, and the relative rotation controlling frame 35 and the magnet 36 cooperate with each other to constitute a relative rotation controlling apparatus.

In accordance with the present invention, as described above, the wheel is provided with a relative rotation controlling apparatus which can control relative rotation between the first member and the second member in a manner such that the relative rotation detecting device will not be actuated when the magnitude of angular acceleration of the wheel in one direction or the other is less than a predetermined magnitude. Hence, it is possible to provide an angular acceleration detecting apparatus of the wheel which can accurately detect the angular acceleration when the angular acceleration, whose absolute value is more than a predetermined value, is produced in the wheel, without being influenced by the temperature conditions in use, by the accuracy of finishing of parts, or by minor deviations in shape and material of the members used.

What is claimed is:

1. A device for detecting angular acceleration of wheels comprising a first member integrally rotating with a wheel whose angular acceleration is to be detected, a second member, resilient means connecting said first and second members for relative rotation in response to angular acceleration of the wheel, detection means for detecting relative rotation of said members, and control means for controlling relative rotation between said members so that actuation of the detection means takes place when the magnitude of angular acceleration of the wheel in either direction exceeds a predetermined magnitude.

2. A device as claimed in claim 1 wherein said control means is regulable so that for increasing relative rotation between the members, the torque resisting relative rotation between the members first decreases to a minimum value and then increases.

3. A device as claimed in claim 1 wherein said control means comprises means resisting relative rotation of said members with diminishing resistance for increasing angles of relative rotation of said members.

4. A device as claimed in claim 3 wherein said means resisting relative rotation of said members comprises magnet means coupled to one of said members, and a displaceable element coupled to the other of said members and magnetically attracted to said magnet means.

5. A device as claimed in claim 4 wherein said magnet means comprises a magnet, said means resisting relative rotation of said members further comprising a force-applying member secured to said other member and engaging said displaceable element to displace the latter away from said magnet as the first and second members undergo relative rotation.

6. A device as claimed in claim 5 wherein two of said displaceable elements and two force-applying members are provided, each displaceable element being associated with a respective pole of the magnet.

7. A device as claimed in claim 5 comprising means for adjusting the force applied by the force-applying member to the displaceable element for any given angular acceleration.

8. A device as claimed in claim 7 wherein said means for adjusting the force comprises means for adjusting the position of engagement of the force-applying member with the displaceable element.

9. A device as claimed in claim 5 wherein said displaceable element is a resilient arm which undergoes bending under the action of said force-applying member.

10. A device as claimed in claim 6 wherein said means resisting relative rotation of said members further comprises a frame secured to said one member and having spaced arms, one carrying said magnet and the other carrying said displaceable elements.

11. A device as claimed in claim 10 wherein said force-applying members comprises two further arms with bent ends respectively engaging said displaceable elements to respectively displace the same away from the magnet as said first and second members undergo relative rotation in opposite directions.

12. A device as claimed in claim 11 wherein said first and second members respectively comprise rings with spaced slits therein, the slits in the two rings being initially offset from one another and being superimposed when the rings have undergone a predetermined degree of relative angular rotation, and light operative means for sensing superposition of said slits, said frame being secured to one of said rings, said force-applying members being secured to the other of said rings.

* * * * *